July 11, 1944.   D. R. SCHNAARS   2,353,626
WEAR COMPENSATING THREAD GAUGE
Filed March 16, 1943

INVENTOR.
David R. Schnaars,
BY George D. Richards
ATTORNEY.

Patented July 11, 1944

2,353,626

UNITED STATES PATENT OFFICE 2,353,626

WEAR COMPENSATING THREAD GAUGE

David R. Schnaars, New Hyde Park, N. Y.

Application March 16, 1943, Serial No. 479,313

6 Claims. (Cl. 33—199)

This invention relates to improvements in gauges for testing screw-threaded parts for accuracy of thread lead, pitch, size, etc.; and the invention has reference, more particularly, to a novel gauge for such and similar purposes which is provided with means for adjusting the same to compensate for wear, so that its accuracy may be maintained over a long period of useful life.

The invention has for an object to provide a thread or similar gauge comprising a circular gauge body having a central gauge opening, said body being contractible to adjust the size of its gauge opening whereby to compensate for any enlargement thereof which may occur by reason of wear incident to its use, said body having a relatively rotatable peripheral means operative, when manipulated, to adjustingly contract the same as may be required.

The invention has for a further object to provide a thread or similar gauge comprising a circular contractible gauge body having an externally screw-threaded tapered periphery, and a rotatable adjusting ring correspondingly internally tapered and screw-threaded to engage the body periphery, whereby rotation of the adjusting ring relative to the body in a proper direction effects a contraction of the body and its contained gauging opening, thereby to adjust the latter so as to take up or compensate any loss of accuracy thereof through wear.

The invention has for another object to provide a novel thread or similar gauge of the kind described which is further provided with means cooperative with its body for locking the same relative to its adjusting ring in any given position to which it has been adjusted by manipulation of the latter.

Other objects of this invention, not at this time more particularly enumerated, will be understood from the following detailed description of the same.

Illustrative embodiments of this invention are shown in the accompanying drawing, in which—

Similar characters of reference are employed in the above described views, to indicate corresponding parts.

Figure 1:
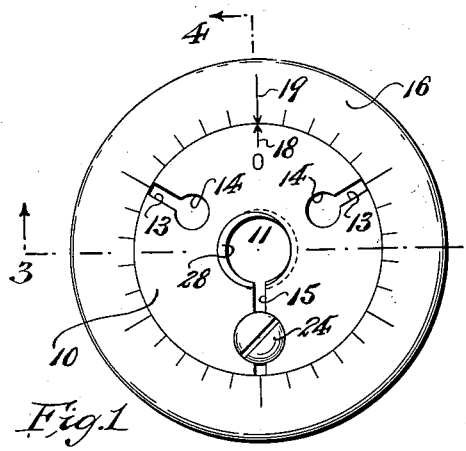
Fig. 1 is an obverse face view of one form of the novel thread or similar gauge according to this invention.
Figure 2:
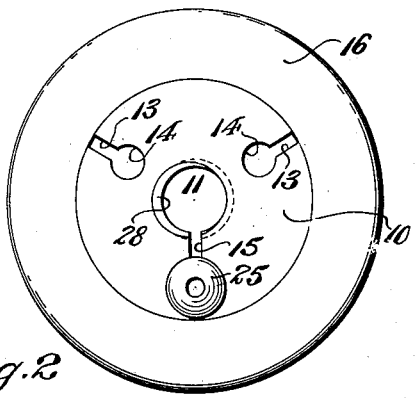
Fig. 2 is a reverse face view of the same.
Figure 3:
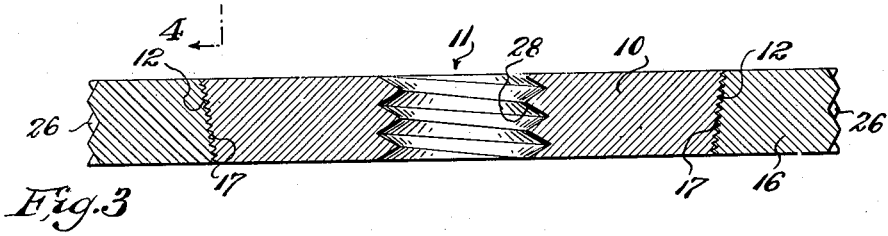
Fig. 3 is a transverse sectional view, taken on line 3—3 in Fig. 1, but drawn on a greatly enlarged scale.
Figure 4:
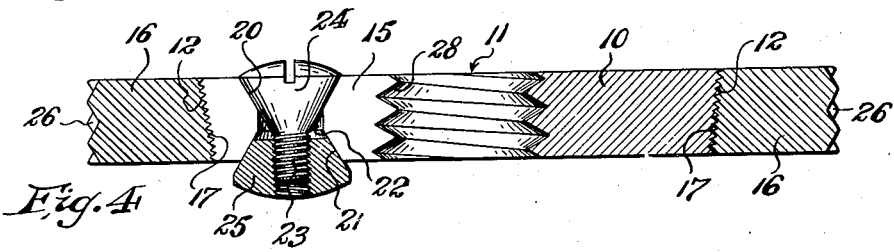
Fig. 4 is a transverse sectional view, taken on line 4—4 in Fig. 1, but also drawn on a greatly enlarged scale.

Referring to Figs. 1 to 4 inclusive of the drawing, the illustrative embodiment of the gauge according to this invention, as therein shown, comprises a circular gauge body 10 of selected thickness having a central gauge opening 11 of selected diametric size corresponding to that of the work to be tested. The external periphery of said gauge body 10 is of tapered conformation, preferably tapering or diminishing from its obverse toward its reverse face as shown. The angle of taper may be varied, but preferably approximates seven and one-half degrees. Said external tapered periphery of the gauge body 10 is provided with comparatively fine external screw-threads 12. In order to permit the gauge body 10 to be contracted, whereby to contract its central gauge opening 11 in compensation of any wear and consequent inaccuracy which may occur with respect thereto incident to the use of the gauge, said gauge body is cut away to provide radial gap or slot means. Preferably a plurality of equi-spaced radial slots are provided to extend inwardly through the gauge body from its external periphery, the same comprising one or more slots 13 which terminate in enlargements 14 spaced outwardly from the central gauge opening 11, and at least one slot 15, the inner end of which intersects or enters said central gauge opening 11.

Cooperative with the externally screw threaded tapered periphery of the gauge body 10 is a relatively rotatable adjusting ring 16. Said adjusting ring 16 is provided with an internal tapered periphery corresponding to the tapered external periphery of the gauge body, the same being provided with internal screw-threads 17 corresponding to and adapted to engage the external screw-threads 12 of said gauge body periphery. The obverse face of said adjusting ring 16 is calibrated to provide spaced graduations around its inner margin each defining a distance of rotation of the adjusting ring 16 relative to the gauge body 10 which will produce a degree of contracting effect upon the latter calculated to produce a predetermined contraction of its central gauge opening 11; the gauge body being provided with an indicative mark 18 relative to which the graduation of the adjusting ring may be read, the latter also having a cooperating indicative mark 19, denoting the normal initial position of the adjusting ring relative to the gauge body. For example, the spacing of said graduations may respectively define a movement of the adjusting ring 16 calculated to contract the gauge body 10 in amount sufficient to reduce the diameter of the central gauge opening 11 by one ten thousandth of an inch, and, if thirty such graduations are provided, as illustratively shown, a complete revolution of the adjusting ring 16 will reduce the diameter of the central gauge opening 11 by three one-thousandths of an inch, which, in many cases, would be the maximum limit of adjustment for satisfactory use of the gauge, so that if wear enlarged the central gauge opening beyond that amount, the useful life of the gauge might properly be considered to be at an end, whereupon the gauge would be discarded, and resort to a new gauge would be advisable. It will be understood that the size of the gauge and its calibration for indicated movement of the adjusting ring 16 relative to the contractible gauge body 10 and the latter's gauge opening 11 for selected or predetermined contractive adjusting effect is subject to wide variation according to the character and size of the work desired to be tested by the gauge.

Means is provided for locking or securing the adjusting ring 16 in any given selected position relative to the gauge body 10, both initially and after adjusting rotation of said adjusting ring, thereby to fix said parts in relatively immovable position while the gauge is in use. One form of means for such purpose, as shown, comprises an inverted conical seat 20 which is countersunk in the obverse face of the gauge body 10 so as to be diametrically intersected by the full slot 15 of said gauge body, and a similar inverted conical seat 21 which is countersunk in the reverse face of the gauge body 10 so as to be likewise diametrically intersected by the full slot 15 of said gauge body. Said seats are interconnected by a through opening 22. Engaged through said opening 22 is the shank of a lock screw 23, the same having a conical head 24 to seat itself in said seat 20. Threaded on the free end of said lock screw 23 is a conical nut 25 adapted to seat itself in the opposite seat 21. The lock screw head 24 and the nut 25 being cuneate and being cooperative with cuneate portions of the gauge body which straddle the slot 15, when screwed together exert a wedging effect upon the gauge body 10 which forces its threaded external peripheral edge into strong frictional engagement with the threaded internal peripheral edge of the adjusting ring 16, thereby strongly fixing said parts against relative movement and consequently against displacement from any given relative position in which they are placed.

The external peripheral edge of the adjusting ring 16 is provided with suitable knurling 26 to facilitate gripping thereof for rotative adjusting manipulation.

Figure 5:
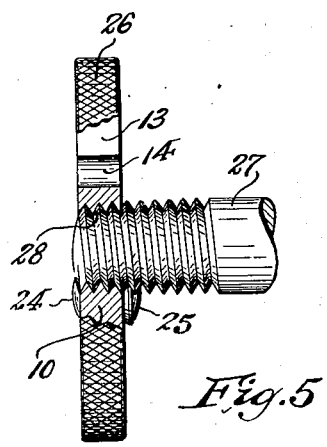
Fig. 5 is an edge elevational and part sectional view of the gauge of Fig. 1 as operatively applied to a screw-threaded part desired to be tested thereby.

When the gauge is designed for testing the accuracy of screw-threaded parts, such, e. g., as a screw-threaded shank or stud 27 (see Fig. 5), the central gauge opening is provided with internal screw-threads 28 corresponding in size and pitch to those desired to be tested. The gauge may be designed to test merely the lead threads at the free end of the shank or stud 27, in which case the threads 28 of the central gauge opening will be provided with the number of threads corresponding to the number of lead threads possessed by the shank or stud to be tested, and also corresponding to the taper of such threads. On the other hand, if the gauge is to be used for testing the body threads of the shank or stud, the internal threads 28 of the central gauge opening 11 will be formed in correspondence thereto, so that the gauge may be screwed along the main threaded body of said shank or stud.

When the gauge is new, the adjusting ring 16 is set in normal initial position relative to the gauge body 10, which position is determined by bringing the respective indicating marks 18 and 19 of these parts in register (see Fig. 1). When the gauge is applied to the shank or stud 27, in order, e. g., to test the lead threads of the latter, the lead end of said shank or stud is screwed into the central gauge opening 11 preferably so as to enter from the reverse face of the gauge. If the lead threads of the shank or stud are perfect, the shank or stud should be stopped when its end registers flush with the obverse face of the gauge (see Fig. 5), thus indicating that the lead threads are perfect. If, after repeated use of the gauge, for thus testing lead threads, the end of an applied shank or stud should move outward beyond the obverse face of the gauge, such occurrence usually indicates wear of the central gauge opening 11, and that the gauge requires adjustment to regain desired accuracy.

To adjust the gauge, in order to compensate for any wear, the locking means, constituted by the lock screw 23—24 and the nut 25 are loosened, a properly threaded master stud or plug (not shown) is inserted in the central gauge opening 11, and thereupon the adjusting ring 16 is turned relative to the gauge body. Owing to the conical or tapered threaded relation of the adjusting ring and gauge body, as the former is thus turned onto the latter it exercises a constrictive or contractive thrust thereon which squeezes in or contracts the central gauge opening 11 to a diameter corresponding to that of the master stud or plug, whereupon the lock-screws 23—24 and 25 are tightened together to set the adjusting ring 16 in position to hold the gauge body and its gauge opening in said contracted condition whereby to again accurately size said gauge opening.

While I have described the gauge having a threaded gauge opening for testing screw-threaded parts, it will be obvious that should it be desired to provide the gauge in a form adapted to test non-threaded or smooth studs or like parts, the internal screw-threads of said gauge opening 11 would be omitted, and the same formed to provide a smooth bore.

Figure 6:
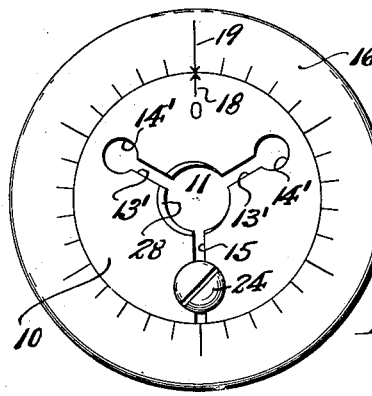
Fig. 6 is an obverse face view of a somewhat modified form of novel thread or similar gauge according to this invention.

Referring to Fig. 6, there is shown a somewhat modified form of the gauge according to this invention wherein certain of the radial slotted portions or gaps instead of extending inwardly from the outer periphery of the gauge body 10 are arranged to extend outwardly from the central gauge opening 11, to provide radial slots 13' terminating short of the outer periphery of the gauge body, and preferably in enlarged end portions 14'. The full slot 15 and associated locking means would in such modified construction of gauge remain the same as first above described.

Having now described illustrative embodiments of my invention, it will nevertheless be understood that various changes could be made in construction thereof as shown in the drawing and above described without departing from the scope of the invention as defined by the following claims, and consequently the said drawing and above described without departing from trative and not in a limiting sense.

I claim:

1. A device for the purposes described comprising a circular gauge body having a central gauge opening, said body being suitably slotted radially to permit contraction thereof and of its gauge opening, said body having a screw-threaded conical external edge, a rotative adjusting ring having a correspondingly screw-threaded conical internal edge engaged with said body edge, and releaseable means to exert a lateral expanding thrust upon said body, whereby to bind the threaded edge of the same to the threaded internal edge of said ring so as to secure said body and ring against rotative displacement from selected relatively adjusted positions.

2. A device for the purposes described comprising a circular gauge body having a central gauge opening, said body being suitably slotted radially to permit contraction thereof and of its gauge opening, said body having a screw-threaded conical external edge, a rotative adjusting ring having a correspondingly screw-threaded conical internal edge engaged with said body edge, and releaseable means to secure said body and ring against rotative displacement from selected relatively adjusted positions, said latter means comprising a lock screw and cooperating nut engaged through a slot of said body whereby to thrustingly bear upon the sides of said slot so as to frictionally bind said mutually engaged edges of said body and ring against relative movement.

3. A device for the purposes described comprising a contractible circular gauge body having a central gauge opening, said body having a plurality of equi-spaced radial slots extending thereinto from its outer periphery, at least one of said slots being a full slot intersecting the central gauge opening of said body, said body having a screw-threaded conical external edge, a rotative adjusting ring having a correspondingly screw-threaded conical internal edge engaged with said body edge, and releaseable means engaged through the full slot of said body, said means being manipulatable to thrustingly bear upon the sides of said full slot so as to frictionally bind said mutually engaged edges of said body and ring against relative movement.

4. A device for the purposes described comprising a contractible circular gauge body having a central gauge opening, said body having a plurality of equi-spaced radial slots extending thereinto from its outer periphery, at least one of said slots being a full slot intersecting the central gauge opening of said body, said body having a screw-threaded conical external edge, a rotative adjusting ring having a corresponding screw-threaded conical internal edge engaged with said body edge, a lock-screw and nut means, an opening intersecting said full slot through which said lock-screw and nut means extends, and said body and lock-screw and nut means having cooperative conical portions whereby tightening of said lock-screw and nut means exerts lateral thrust against said full slot sides so as to frictionally bind said mutually engaged edges of said body and ring against relative movement.

5. A device for the purposes described comprising a discontinuous circular gauge body having a central gauge opening, said body having a screw-threaded conical external edge, a continuous rotative adjusting ring having a correspondingly screw-threaded conical internal edge engaged with said body edge, and releaseable means intermediate and cooperative with the ends of said discontinuous body adapted to exert a spreading thrust thereupon, whereby to bind said body and ring together against rotative displacement from selected relatively adjusted positions.

6. A device for the purposes described comprising a discontinuous circular gauge body having a central gauge opening, said body having a screw-threaded conical external edge, a continuous rotative adjusting ring having a correspondingly screw-threaded conical internal edge engaged with said body edge, and a lock-screw and nut means disposed between the ends of said discontinuous body, said latter means having a wedge-like formation adapted, when tightened, to exert a spreading thrust upon said body ends, whereby to bind said body and ring together against rotative displacement from selected relatively adjusted positions.

DAVID R. SCHNAARS.